R. BOBO.
WIND MOTOR.
APPLICATION FILED JUNE 6, 1916.

1,243,135.

Patented Oct. 16, 1917.
2 SHEETS—SHEET 1.

Inventor
R. Bobo
By Victor J. Evans
Attorney

Witnesses

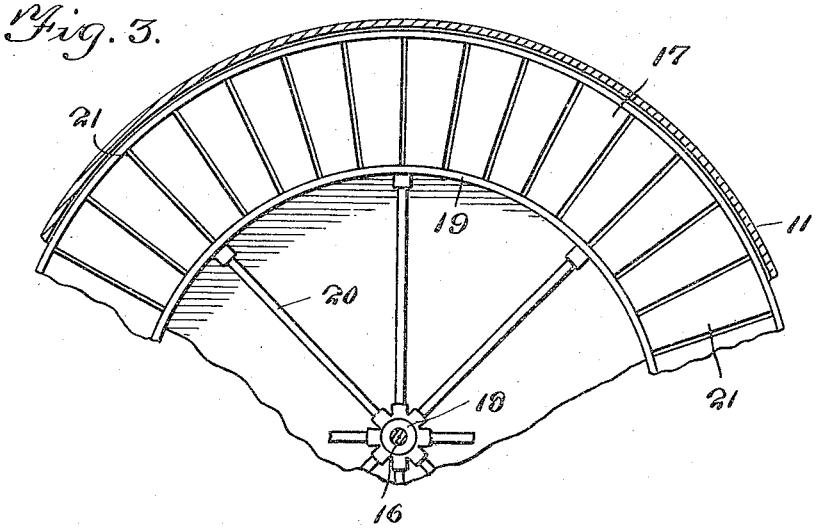
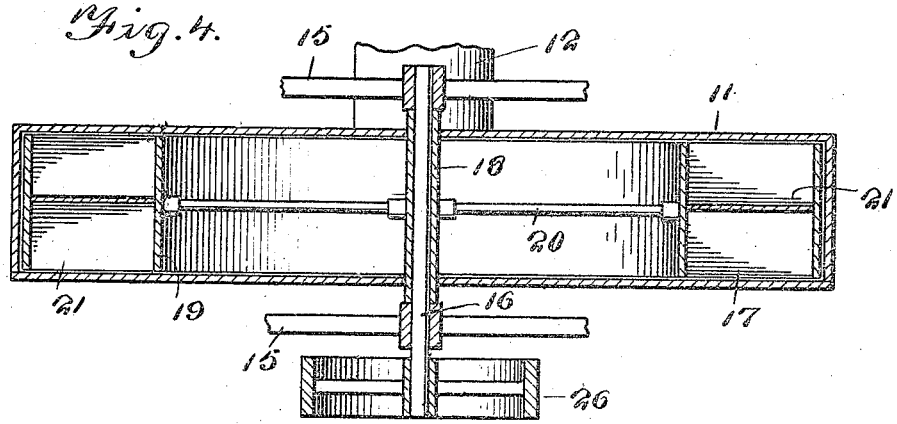
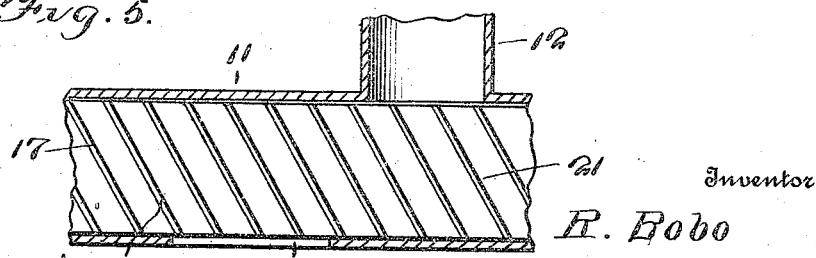

UNITED STATES PATENT OFFICE.

RUBEN BOBO, OF SILVIS, ILLINOIS.

WIND-MOTOR.

1,243,135.  Specification of Letters Patent.  Patented Oct. 16, 1917.

Application filed June 6, 1916. Serial No. 102,058.

*To all whom it may concern:*

Be it known that I, RUBEN BOBO, a citizen of the United States, residing at Silvis, in the county of Rock Island and State of Illinois, have invented new and useful Improvements in Wind-Motors, of which the following is a specification.

This invention comprehends the provision of a wind motor wherein a suction is created in advance of a bladed wind wheel mounted for rotation, so that the air while being drawn through the flue forcibly rotates the wheel, thereby developing power for various purposes.

This invention aims to provide a motor of the above mentioned character which is simple in construction, yet very efficient for the purpose intended, means being provided to regulate the speed of the wheel, and to render the same inoperative when desired.

The nature and advantages of the invention will be better understood when the following description is read in connection with the accompanying drawings, the invention residing in the construction, combination and arrangement of parts as claimed.

In the drawings forming part of this specification like numerals of reference indicate similar parts in the several views and wherein :—

Fig. 3 is an enlarged vertical sectional view.

Fig. 4 is an enlarged horizontal sectional view.

Fig. 5 is a diagrammatic view.

Figure 1:
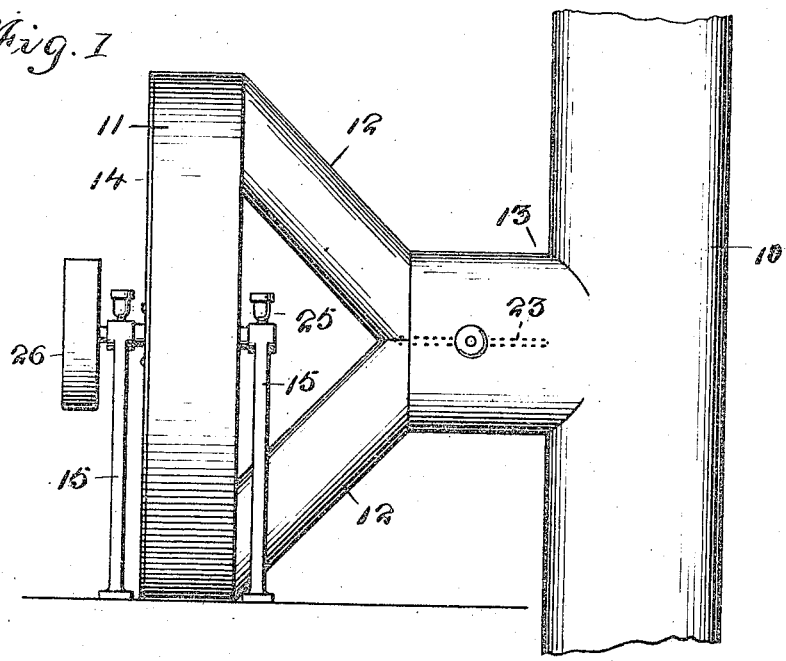
Figure 1 is a side elevation.
Figure 2:
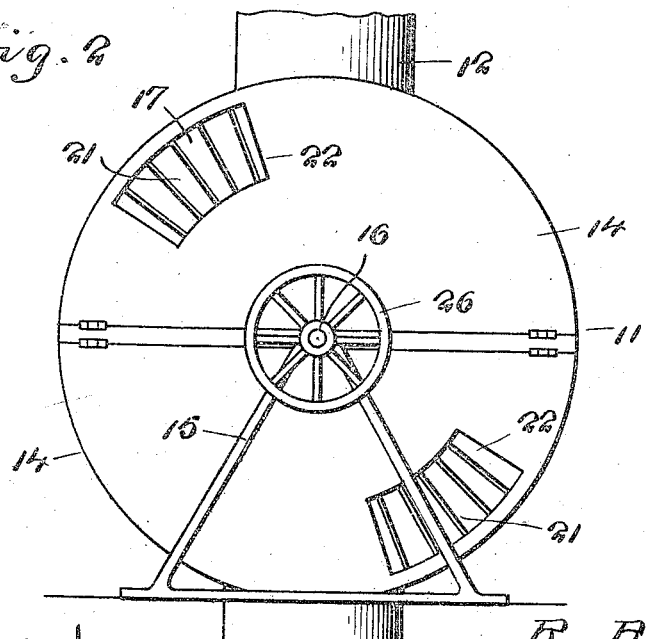
Fig. 2 is a front view.

Referring more particularly to the drawings 10 designates a flue which can be associated with any suitable form of heating apparatus for the purpose of creating a suction within the flue. Disposed to one side of the flue is a casing 11 connected with the flue by means of the divergently disposed pipes 12, which latter lead from a suitable opening 13 in the flue and serve to establish communication between the latter and the casing 11. The casing 11 is provided with a cover 14 which is preferably made up of a pair of hinged sections to permit access to be had to the casing when desired. Standards 15 are arranged at the front and rear of the casing 11 and constitute bearings for the shaft 16 which is extended transversely through the casing and which has keyed or otherwise fixedly secured thereto a wind wheel 17. The latter preferably consists of a hub 18 and a concentrically disposed rim 19 connected with the hub by means of the spokes 20. Radiating from the rim 19 are blades 21 disposed at an angle with relation to the axis of the wheel as shown. The cover 14 is provided at diametrically opposite points with openings 22 the size of which are regulated by the dimensions of the openings 13 in the flue. It is manifest that as suction is created within the flue 10, a vacuum is created immediately in advance of the casing 11, so that the impact of the air drawn through the openings 22 against the blades 21 will forcibly rotate the wheel thereby developing power for use in various connections, the air being conveyed from the casing through the pipes 12 into the flue 10. I have found that by introducing the air into the casing 11 at an angle with respect to the blades 21, more power is obtained than would otherwise be secured by having the openings 22 arranged immediately in advance of the pipes 12. I therefore dispose the openings 22 out of alinement with the pipes 12 and proportion the length of the blades consistently with the width of the openings 22, so that the air currents in addition to being introduced into the casing 11 at the desired angle, will operate on the wheel adjacent the periphery thereof, so as to develop the maximum degree of power under all conditions. Of course the height of the flue and the size of the wheel and the respective openings are matters of importance in the production of the motor for various kinds of work, and it is desired to have it understood that the dimensions of the component parts of the invention may be varied as the occasion may require. A damper 23 is arranged within the opening 13 of the flue for the purpose of controlling the communication between the latter and the casing 11 which obviously permits the speed of the wheel to be regulated, and rendered inoperative if so desired. The lubricating cup 25 can be fixed upon the shaft bearing, while a pulley 26 is also fixed relatively thereto over which a belt or the like may be trained for transmitting power developed by the motor to any suitable source.

While it is believed that from the foregoing description the nature of the invention will be readily apparent, I desire to have it understood that what is herein shown and described is merely illustrative of the preferred embodiment of the invention to which I do not limit myself and that such changes in the construction and arrangement of parts may be resorted to when desired as fall within the scope of what is claimed.

What is claimed is:—

1. The combination with a suction flue, of a casing having air inlet openings in the front wall thereof, and air outlet openings in the back wall disposed out of alinement with the air inlet openings, a short pipe extension projecting from said flue, a pair of divergently disposed pipes leading from said outlet openings, and having their associated extremities fitted within said extension, a bladed wheel journaled in the casing to be rotated by air passing therethrough, and a damper pivoted within said extension for controlling the movements of said wheel.

2. The combination with a suction flue, of a casing in communication therewith having an inlet opening and an outlet opening, and a bladed wind wheel journaled in the casing in position to be rotated by the air passing therethrough with its blades traversing the space between said openings, said openings being arranged upon the opposite sides of the wheel remote from and upon the same side of the axis of rotation at approximately equal distances therefrom and out of axial alinement.

In testimony whereof I affix my signature.

RUBEN BOBO.

Copies of this patent may be obtained for five cents each, by addressing the "Commissioner of Patents, Washington, D. C."